ately thin powder foil coated on its inside surface with a percussion-sensitive material, for example, tetrazene or tetrazene-trizinate.

United States Patent

[11] 3,580,180

[72] Inventors Heinz Gawlick
 Furth;
 Gunther Marondel, Erlangen, Germany
[21] Appl. No. 668,797
[22] Filed Sept. 19, 1967
[45] Patented May 25, 1971
[73] Assignee Dynamit Nobel Aktiengesellschaft
 Troisdorf, Germany

[54] CONSUMABLE INDUSTRIAL PROPELLANT CARTRIDGE
 7 Claims, 2 Drawing Figs.

[52] U.S. Cl...................................................... 102/101,
 102/39, 102/45, 102/86.5, 102/40
[51] Int. Cl...................................................... F42b 1/02
[50] Field of Search......................................... 102/38, 39,
 99, 100, 101, 104, 45, 86.5; 149/10, 2, 14, 15, 16

[56] References Cited
 UNITED STATES PATENTS
 53,168 3/1866 Moffatt ........................ 102/45

| | | | |
|---|---|---|---|
| 694,295 | 2/1902 | Maxim ......................... | 102/100 |
| 726,901 | 5/1903 | Gathmann.................... | 102/101 |
| 1,316,360 | 9/1919 | Delpech ....................... | 149/14 |
| 2,407,264 | 10/1946 | Ferrel........................... | 102/86.5 |
| 3,311,057 | 3/1967 | Quinlan et al. .............. | 102/38 |
| 3,372,643 | 3/1968 | Kvavle.......................... | 102/99 |

OTHER REFERENCES
 Bebie, Manual of Explosives, Military Pyrotechnics and Chemical Warfare Agents, Compositions Properties Uses, 1943, page 144

*Primary Examiner*—Robert F. Stahl
*Attorney*—Craig, Antonelli, Stewart & Hill

ABSTRACT: A consumable industrial propellant cartridge having a form-stabilized annular propellant charge body filled with loose ignitor composition and closed at both ends with a relatively thin powder foil coated on its inside surface with a percussion-sensitive material, for example, tetrazene or tetrazene-trizinate.

PATENTED MAY 25 1971  3,580,180

INVENTORS
HEINZ GAWLICK
GUNTHER MARONDEL

BY  *Craig & Antonelli*

ATTORNEY

CONSUMABLE INDUSTRIAL PROPELLANT CARTRIDGE

BACKGROUND OF THE INVENTION

It is particularly desirable to obtain a propellant cartridge that will not produce impurities that would impair the rapid recharging and operation of an industrial powder-charge-driven apparatus, particularly for driving bolts, stunning cattle, etc. Cartridges known prior to the present invention satisfy this requirement only to an inadequate degree, or not at all, because the high pressure prevailing in the cartridge chamber will commonly splinter or tear the walls of the cartridge case thus producing residues that remain within the cartridge chamber of the industrial apparatus. While attempts have been made to obviate this drawback, for example by providing predetermined breaking zones in the cartridge case, none of these attempts have met with decisive success.

It has generally been thought to be impossible to eliminate the cartridge case, because of safety requirements.

SUMMARY OF THE INVENTION

It is an object of the present invention to overcome the above disadvantages by providing an industrial propellant cartridge that is completely consumable within the cartridge chamber without leaving any residues. Also, the unnecessary weight of the cartridge case is economically and advantageously eliminated. The cartridge of the present invention employs a cast or pressed propellant powder body having preferably a centrally located recess filled with a powder charge that is easily ignitable by percussion.

The danger of unintentional ignition outside of the cartridge case is not present with the cartridge of the present invention, because the cartridge itself does not have an anvil required for ignition, or if such an anvil is used, the ignition will be brought about only by an impact or percussion upon the percussion-sensitive powder charge disposed within the recess of the powder charge body, which would require a specific detonating tool that could be inserted into the recess.

The main powder charge body may be provided as a flat tablet with a central depression or recess extending over substantially the entire height thereof. Such a construction is particularly advantageous in regard to casting or pouring the powder body. Also, the propellant powder body may be provided as a flat ring or annular element, which is also well suited for casting.

The propellant powder charge with the central recess eliminates the need for orienting the propellant cartridge within the cartridge chamber of the firing apparatus, since the cartridge may be struck by the detonating element from either axial end. It is particularly advantageous to cover the recess or central depression with a powder foil, which may be secured by bonding or gluing. If the powder body is in the form of a ring, a powder foil may be provided to cover both ends of the central aperture.

With the employment of powder foils for covering the central recess or aperture, it is particularly desirable to construct the powder foil from a percussion-sensitive powder, that is a powder that is readily ignitable by percussion or impact. Also, the ignition or detonating safety and the intensity of the propellant charge kindling or inflammation may simultaneously be advantageously increased by providing a foil for covering the central recess or aperture and coating the inside surface of the foil with a mixture readily ignitable by percussion, for example tetrazene or tetrazene-trizinate. When a central recess or aperture is completely covered by one or more foils, the percussion-sensitive powder within the recess or aperture may be loose grained to increase its ignition sensitivity. The powder foil may be the only element ignitable by percussion so that conventional powders may fill the recess or the powder within the recess may be the only powder ignitable by percussion, or both may be ignitable by percussion.

Various types of powders may be used for the various elements. For example, pure nitrocellulose powder may be used for the main propellant charge body and is preferably a porous powder. The porous powder assures good burning and ignition due to its large surface area and may be compressed into a firm form-retaining mass at relatively low pressures without the pores being closed thereby. The powder foil is preferably percussion-sensitive, unless it is desired only to have the powder within the recess percussion sensitive.

The powder body may have various shapes and forms, and the powder foil may be of various thicknesses dependent upon the particular requirements to be met. For example, the thickness of the powder foil and the powder charge mass will depend upon the percussion or impact energy that is available and the desired propellant energy.

As a particular example, the powder body may be ring shaped with thin powder foils closing both ends of the aperture and have a thickness of 0.2 mm. Also, the propellant charge should preferably have a nitroglycerin content of at least 40 percent. The amount of percussion-sensitive powder to be filled in the recess would be directly correlated with the thickness of the foil covering the recess, if the foil is not percussion sensitive. Thus, in this case, it is particularly desirable to keep the foil as thin as possible.

Further objects, features and advantages of the present invention will become more clear from the following detailed description of a single preferred embodiment shown in the attached drawing.

DETAILED DESCRIPTION OF THE INVENTION

Figure 1:
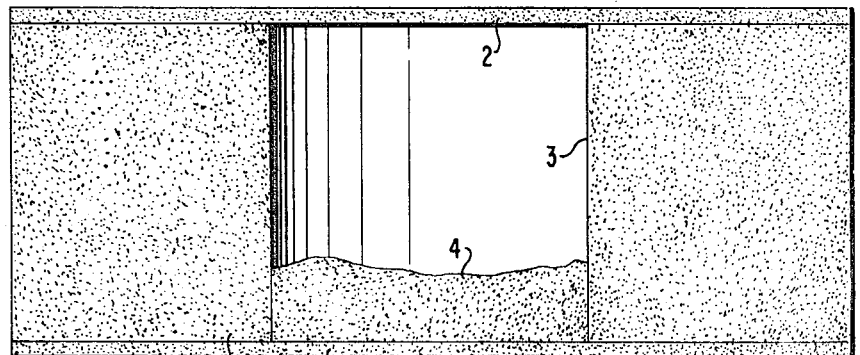
FIG. 1 is a cross-sectional view through the axis of symmetry of a consumable cartridge constructed according to the teachings of the present invention.
Figure 2:
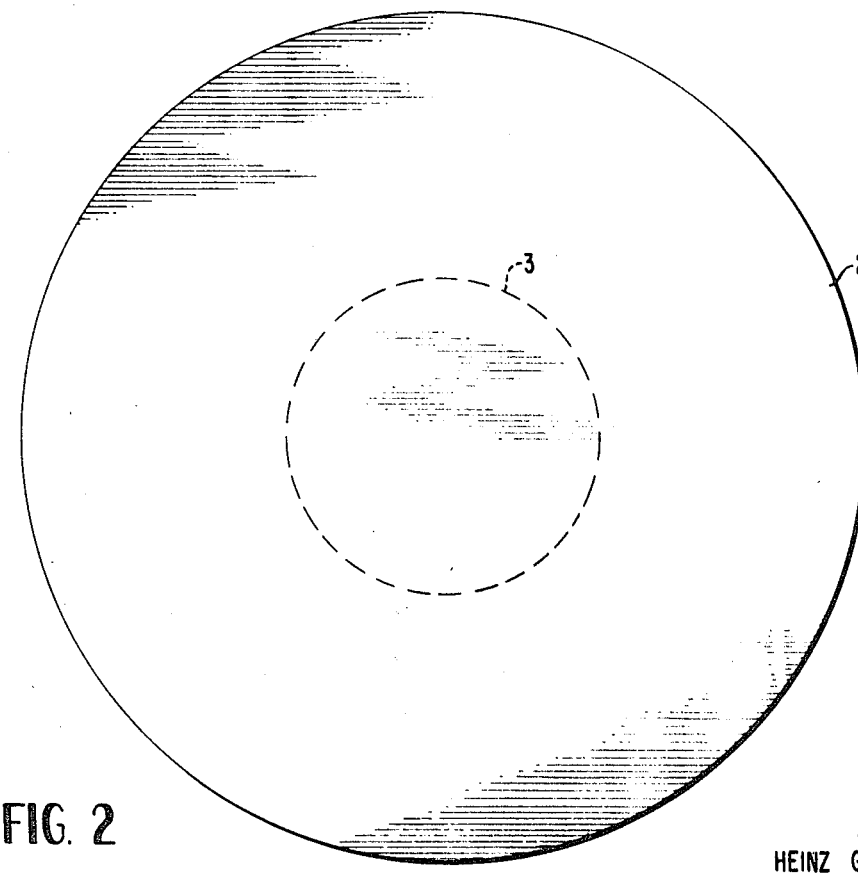
FIG. 2 is a top plan view of the cartridge of FIG. 1.

As shown in FIGS. 1 and 2, the cylindrical propellant powder body or element 1 may be either cast, poured or pressed from a porous powder, preferably in a ring form with a central aperture extending entirely therethrough. Both axial ends of the central aperture are covered by means of percussion-sensitive powder foils 2. The central recess 3 is partially filled with loose grain powder 4.

The illustrated cross-sectional dimensions and height of the powder ring 1, as well as the thickness of the foil 2 and the quantity of loose powder 4 have been set forth as specific advantageous structural elements. According to the broader aspects of the present invention, all of the above characteristics may be widely varied. For example, the sensitivity to ignition of the powder body 1 may be increased by forming the central recess with a star-shaped cross-sectional profile perpendicular to the axis of symmentry. Also, less simple arrangements may be constructed according to the teachings of the present invention.

We claim:

1. A caseless consumable propellant cartridge for commercial and industrial apparatus not employing a projectile for driving bolts, or the like, consisting essentially of easily combustible material and comprising a dimensionally stable propellant powder body having a generally central recess therein, an ignitor powder ignitable by percussion and in said recess, said propellant powder body is a flat tablet having an axis of symmetry, said recess centrally extends over substantially the entire axial height of said tablet, said recess opens in one axial direction from said tablet and including a powder foil attached to said tablet covering said recess, and the walls of said recess and the adjacent surface of said powder foil are provided with a coating consisting of a highly percussion-sensitive powder.

2. The device of claim 1, wherein said coating powder is selected from the group consisting of tetrazene and tetrazene-trizinate.

3. A caseless consumable propellant cartridge for commercial and industrial apparatus not employing a projectile for driving bolts, or the like, consisting essentially of easily combustible material and comprising a dimensionally stable propellant powder body having a generally central recess therein, an ignitor powder ignitable by percussion and in said recess, said propellant powder body is a flat annular ring having a central through recess, a powder foil covering each end of said central recess in said annular ring, said powder foils are readily ignitable solely by percussion, and said foils are coated with a percussion-sensitive powder.

4. The cartridge of claim 3, wherein said percussion-sensitive powder is selected from the group consisting of tetrazene and tetrazene-trizinate.

5. A caseless consumable propellant cartridge for commercial and industrial apparatus not employing a projectile for driving bolts, or the like, consisting essentially of easily combustible material and comprising a dimensionally stable propellant powder body having a generally central recess therein, an ignitor powder ignitable by percussion and in said recess, said propellant powder body is a flat annular ring having a central through recess, a powder foil covering each end of said central recess in said annular ring, the walls of said ring recess and the inside surfaces of said powder foils are coated with a percussion-sensitive powder.

6. The cartridge according to claim 5, wherein said percussion-sensitive powder is selected from the group consisting of tetrazene and tetrazene-trizinate.

7. The cartridge according to claim 6, wherein said powder within said recess only partially fills said recess and is in loose granular form.